(12) United States Patent
Sachs et al.

(10) Patent No.: US 8,023,424 B2
(45) Date of Patent: Sep. 20, 2011

(54) COMMUNICATION NODE AND A METHOD FOR ROUTING TRAFFIC IN A COMMUNICATION NETWORK BY CALCULATING AT LEAST ONE METRIC FOR AT LEAST ONE LINK AND A SENSITIVITY PARAMETER FOR SAID METRIC

(75) Inventors: Joachim Sachs, Aachen (DE); Mikael Prytz, Ronninge (SE); Per Olof Magnus Magnusson, Linkoping (SE); Johan Lundsjo, Spanga (SE)

(73) Assignee: Telefonaktiebolaget L M Ericsson (Publ), Stockholm (SE)

( * ) Notice: Subject to any disclaimer, the term of this patent is extended or adjusted under 35 U.S.C. 154(b) by 362 days.

(21) Appl. No.: 11/914,657

(22) PCT Filed: Jun. 20, 2005

(86) PCT No.: PCT/SE2005/000948
§ 371 (c)(1),
(2), (4) Date: Jul. 7, 2008

(87) PCT Pub. No.: WO2006/126924
PCT Pub. Date: Nov. 30, 2006

(65) Prior Publication Data
US 2009/0213849 A1    Aug. 27, 2009

(30) Foreign Application Priority Data

May 26, 2005  (SE) .................. PCT/SE2005/000792

(51) Int. Cl.
*H04L 12/56*  (2006.01)

(52) U.S. Cl. ..................................... 370/252; 370/254
(58) Field of Classification Search .......... 370/237–238, 370/400
See application file for complete search history.

(56) References Cited

U.S. PATENT DOCUMENTS

| | | | |
|---|---|---|---|
| 6,667,958 B2 * | 12/2003 | Phan et al. ................... | 370/238 |
| 6,697,334 B1 * | 2/2004 | Klincewicz et al. .......... | 370/238 |
| 7,142,524 B2 * | 11/2006 | Stanforth et al. ............. | 370/328 |
| 7,181,214 B1 * | 2/2007 | White ......................... | 455/435.1 |
| 7,277,392 B2 * | 10/2007 | Venteicher et al. ........... | 370/237 |
| 7,388,841 B2 * | 6/2008 | Shao et al. .................... | 370/238 |
| 7,412,241 B2 * | 8/2008 | Strutt ............................ | 455/445 |
| 7,542,459 B2 * | 6/2009 | Conner et al. ................ | 370/351 |

(Continued)

FOREIGN PATENT DOCUMENTS

EP        1889411 B1    2/2008

(Continued)

*Primary Examiner* — Gary Mui
*Assistant Examiner* — Ben Liu
(74) *Attorney, Agent, or Firm* — Roger S. Burleigh

(57) ABSTRACT

The invention relates to a method of routing traffic from a sender to a receiver in a communication network said method comprising for at least two possible routes between the sender and the receiver the step of calculating at least one metric for at least one link in each route, characterized by the steps of calculating a sensitivity parameter for said at least one metric and taking said sensitivity parameter into account when selecting a route. The sensitivity parameter may be based on a derivative of said metric with respect to a variable on which said metric depends. The method may also comprise the step of calculating a reliability parameter for said at least one metric and taking said reliability parameter into account when selecting a route.

14 Claims, 2 Drawing Sheets

U.S. PATENT DOCUMENTS

| | | | |
|---|---|---|---|
| 7,581,022 B1 * | 8/2009 | Griffin et al. | 709/238 |
| 7,626,945 B1 * | 12/2009 | Klincewicz et al. | 370/254 |
| 2006/0262776 A1 * | 11/2006 | Pollock | 370/352 |
| 2007/0070983 A1 * | 3/2007 | Redi et al. | 370/352 |
| 2010/0074115 A1 * | 3/2010 | Klincewicz et al. | 370/238 |

FOREIGN PATENT DOCUMENTS

WO    WO 2004/084614 A2    10/2004

* cited by examiner

COMMUNICATION NODE AND A METHOD FOR ROUTING TRAFFIC IN A COMMUNICATION NETWORK BY CALCULATING AT LEAST ONE METRIC FOR AT LEAST ONE LINK AND A SENSITIVITY PARAMETER FOR SAID METRIC

BACKGROUND OF THE INVENTION

The present invention applies to a communication network in which data can be transmitted from a sender to a receiver via a number of intermediate network nodes. Data can be transmitted via different routes, each comprising one or more of the intermediate network nodes. A direct path between two adjacent nodes is referred to as a link. Depending on which communication links are used for a communication flow different transmission routes (or paths) through the network from the sender to the receiver can be distinguished.

It is important in any such communication system to optimize the selection of the routes to utilize the resources as efficiently as possible.

In existing routing solutions a route selection is typically based on assigning a cost value, or metric, to each communication route, that is, a route metric. The route metric is generally determined as the sum of the metric values for all links, or hops, in the route. Typically, but not necessarily each node determines link metric values for its own links and the values are distributed to other nodes using routing protocols. The best route is typically selected to be the route that has the best route metric.

This prior art solution has several problems. One is that the metric assigned to a route may have an uncertainty. The metric may be determined based on the estimation of link properties that may be subject to estimation errors. It may also take some time before a metric can be considered when making a routing decision. This may be due to the fact that certain changes, for example, in link properties, take some time before they are measured in the estimation process and thus influence an associated metric. Also, it may take some time for a metric to be distributed to a function which uses this metric for a routing decision.

The prior art solution described above also does not take into account the fact that the route metric is a dynamic parameter, which changes over time, for example as the load in the network changes.

OBJECT OF THE INVENTION

It is an object of the present invention to enable more efficient use of network resources by improving routing through the network.

SUMMARY OF THE INVENTION

This object is achieved according to the present invention by a communication node for use in a communication network in which data can be transmitted between a sender and a receiver via at least two different routes, each route comprising at least one link, said node comprising a link management function unit arranged to calculate at least one metric value for said at least one link, characterized in that the link management function unit is also arranged to calculate a sensitivity parameter value for said at least one metric, said sensitivity parameter being indicative of how the metric would change with a given change in the network.

The object is also achieved by a method of routing traffic from a sender to a receiver in a communication network said method comprising for at least two possible routes between the sender and the receiver the step of calculating at least one metric value for at least a first link in the network, characterized by the steps of calculating a sensitivity parameter value for said at least one metric, said sensitivity parameter being indicative of how the metric would change with a given change in the network, and taking said sensitivity parameter into account when selecting a route.

Thus, the routing mechanism according to the invention is based on the metric for each route and on the sensitivity of this metric to changes in the network, for example changes to the load in the network.

The routing mechanism may also take into account the reliability of the metric by calculating a reliability parameter for the metric and taking this reliability parameter into account when making the routing decision.

The link management function unit is preferably also arranged to transmit said metric and/or said sensitivity and/or said reliability parameter values to at least one other link management function unit of another node in the communication network and/or receive metric and/or sensitivity and/or reliability parameter values from at least one other link management function unit of the other node in the communication network.

One or more of the nodes comprise means for selecting a route through the communication network based on the metric and sensitivity and/or reliability parameter values.

In prior art a routing decision is typically based on the metric of the route prior to that routing decision. However, once data is transmitted on the route the metric will generally change. According to the invention this is accounted for by considering the metric's sensitivity to changes in the network, preferably by taking into account the derivative of the metric with respect to the traffic load.

The invention improves the performance, service quality support and capacity of communication networks by improving the routing decisions.

While the invention is applicable to any routed communication network it is particularly useful for wireless multi-hop and/or ad-hoc networks. In particular it is useful for heterogeneous multi-hop networks where different link technologies (for example, different radio access technologies) are used.

| Acronyms | |
|---|---|
| ARQ | Automatic Repeat Request |
| BLER | Block Error Rate |
| LMF | Link Management Function |
| RAT | Radio Access Technology |

BRIEF DESCRIPTION OF THE DRAWINGS

The present invention will be described in more detail in the following, with reference to the appended drawings, in which.

DETAILED DESCRIPTION OF EMBODIMENTS

Figure 1:
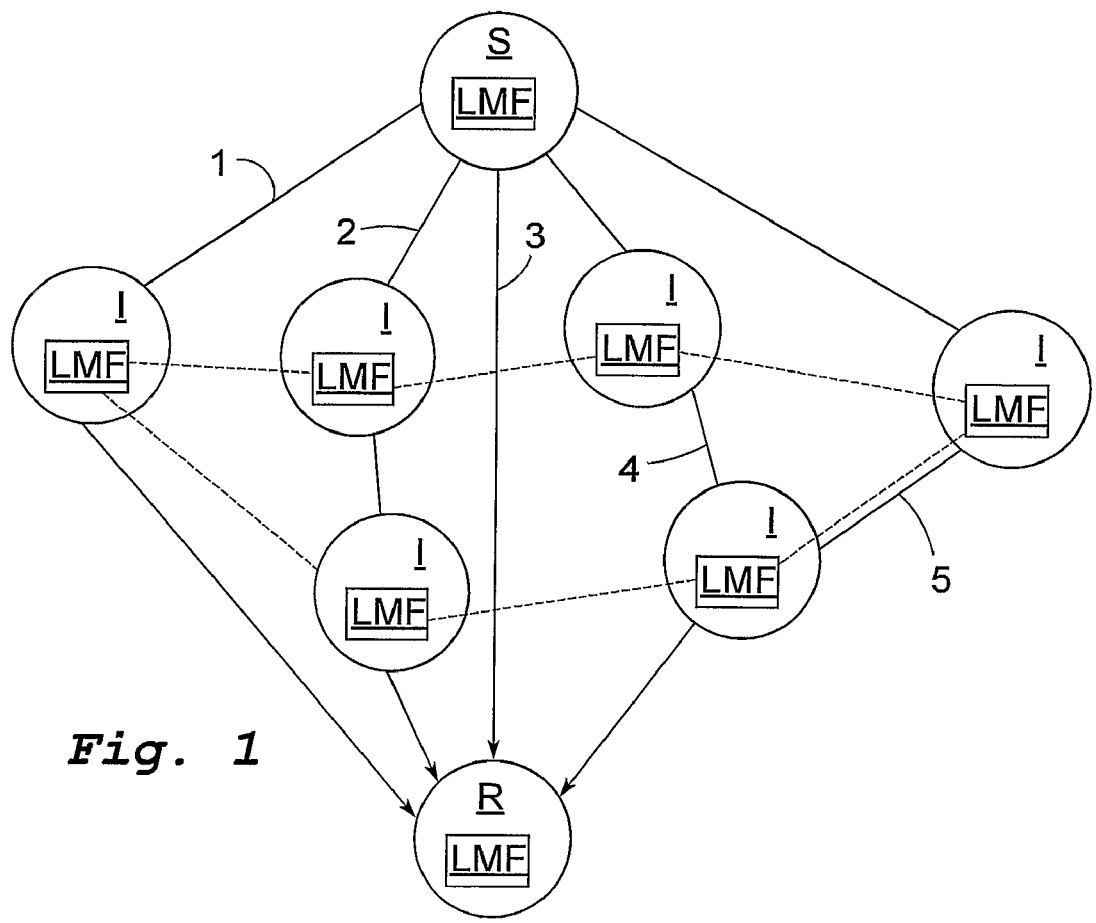
FIG. 1 illustrates schematically transmission via a number of possible routes through a communication network.

FIG. 1 illustrates schematically transmission of data from a sender S to a receiver R via a number of possible routes through a communication network. The network comprises a number of intermediate nodes I, through which the data can be routed. In FIG. 1, five different routes 1, 2, 3, 4, 5 are shown. The path from a first node to a next node is referred to as a link, or hop. The first node can be either a sender S or intermediated node I. The next node can be either a further intermediate node I or a receiver R. When routing the data, traditionally a metric referred to as the cost is determined for each route as the sum of the cost of all links, or hops, in the route. Typically, the route having the lowest cost is selected. At least some of the nodes comprise a link metric function unit LMF, which controls and/or monitors the link characteristics needed for determining a link metric for the link starting at the node. Link metrics for each node are communicated to the link metric function units of other nodes, as indicated by the dashed lines in FIG. 1. Some nodes may only provide information to other nodes, some nodes may only receive information from other nodes, and some may do both. If a node does not have a link metric function unit, the link metrics for this node may be determined in another node. The link metric function unit will be discussed in more detail below. Examples of link metrics will be given in Table 1 below.

For bidirectional traffic, the sender can at the same time be receiver. Although a route metric does not need to be symmetrical in both directions, typically this is the case and thus for both directions the same path is selected. So if the Sender makes a routing decision for one direction it can distribute this information to the Receiver, which is the sender for the reverse direction. In this case the receiver has been involved in the routing decision as well.

For each candidate route i considered in a routing algorithm one or more metrics $M_i$ are considered, i being the number of the route. The metric of a route can be based on, for example:
- the number of hops in the route
- the route quality
- the supported rate
- the delay
- the traffic load
- the capacity
- the bit and/or block error rate Such a route metric is derived from all or some of the link metrics, which are determined for each hop of the route. The skilled person is familiar with how to determine route metrics.

The routing decision is typically based on the metric of the route prior to that routing decision. For example, two possible routes, A and B may have a very similar route metric $M_A$ and $M_B$, respectively, where $M_A < M_B$. In this example it is assumed that a low value of the metric is a better property for the route. According to these metrics a routing decision function will assign route A to a data flow. However, it may be that one link in route A has a heavy load, which means that $M_A$ increases drastically after the new flow is assigned to route A. If, in contrast, the links of route B have a low load, $M_B$ would only change a little if a new flow was assigned to it. This will be explained in more detail below.

According to the invention, in addition to the metric itself the reliability $R_i$ and/or the sensitivity $S_i$ of the metric is considered.

The metric reliability can be based, among other things, on the following aspects:
- the reliability of the metric estimation
- the rate of change of this metric, for example, influenced by
  - the velocity of a node,
  - the type of radio access technology,
  - the frequency band,
  - statistics of the rate of change of the metric in the past
- the frequency with which the metric is estimated
- the frequency with which estimated metric values are distributed
- the signalling delay of metric values In the above description every route is assumed to have only one single metric. A route may, however, have a number of metrics assigned to it and a routing algorithm using several of these metrics. This invention, of course, is also applicable if a number of metrics is used, where for at least one of these metrics a sensitivity value and/or a reliability value would be considered.

The metric sensitivity describes how the metric varies depending on a certain input parameter p. The input parameter can be, for example, a change in the traffic rate (traffic load), a change in quality of service (QoS) requirements, a change in the typical packet size, or something else. The metric sensitivity $S_i(p)$ thus describes how the metric Mi changes if the parameter p changes. In the case that $S_i(p)$ is a complex function, a simplified form of describing the metric sensitivity may be useful. This may be done, for example, by using a certain number of elements in a Taylor series expansion of the complex function.

Figure 2:
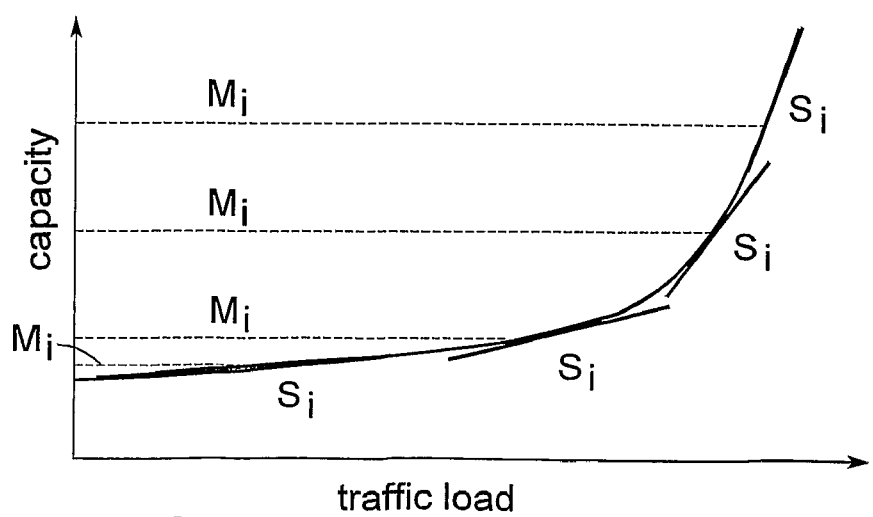
FIG. 2 shows an example of the sensitivity of a metric.

An example of the sensitivity of a metric is given in FIG. 2. As can be seen, in this example, the metric for capacity increases with the parameter traffic load. When the traffic load is low the metric increases slowly and $S_i$ is low. When the traffic load increases the metric curve becomes steeper, that is, the sensitivity $S_i$ of the capacity increases, as can be seen by the straight lines indicating the change of capacity with changing load at different values of the traffic load.

Reliability and sensitivity may vary for different hops of a route. For the overall route reliability and sensitivity the reliability and sensitivity must be combined in a suitable way.

According to the invention the actual routing algorithm will make a routing decision based on a decision metric. This decision metric is a combination of the routing metric M with the metric reliability R and/or the metric sensitivity S. Referring again to FIG. 1, this means that in addition to the metric $M_i$ for each possible route through the network, a reliability parameter $R_i$ and/or a sensitivity parameter $S_i$ is determined for each route i.

Different solutions of determining the decision metric are possible, for example:
- filtering routes: all routes where R exceeds certain thresholds can be removed from the set of possible routes,
- scaling metrics: the route metric M can be scaled by the corresponding metric reliability R and/or the metric sensitivity S. Similarly, link metrics can be scaled by their reliability or sensitivity before they are included in the route metric.
- Predictive metric: based on an expected change of an input parameter p, the predicted metric PM is estimated depending on the actually determined metric M and the metric sensitivity with respect to a parameter p.

In table 1 a number of link metrics will be discussed.

TABLE 1

| Type of Link Metric | Determination of Link Metric (M) by LMF | Link Metric Reliability (R) determined by LMF | Link Metric Sensitivity (S) with respect to parameter P determined by LMF |
|---|---|---|---|
| Supported rate [kb/s] | The rate that can be used for that link, depending on link capacity, link quality, traffic load, type of RAT, Multiple-Access Scheme, etc. | Can be directly determined by LMF based on precision, reliability and timeliness of link measurements and variability of the rate. | P = traffic load: LMF can determine how M would change for a change of traffic load by P. S depends e.g. on the total capacity c, the load in the system I. LMF can determine how M would look like if a total load increase to I + P (relative load (I + P)/c). The detailed formula depends on the type of RAT, the multiple-access scheme etc. |
| Transmission delay on link [ms] | Depends on type of RAT (interleaving, frame structure, . . .), link delay, ARQ operation and BLER. May also depend on load (multiple-access delay and queuing delay). | See above. | P = traffic load: Increase in load can increase multiple-access delay and queuing delay. |
| Available link capacity [kb/s - circuit-switched-equivalent] | same as supported rate | | |
| Absolute traffic load, used capacity [kb/s - circuit-switched-equivalent] | Mainly useful if absolute capacity is also provided: E.g. this link has a capacity of ~12 Mb/s with a current average load of 8 Mb/s. | | |
| Relative traffic load [% of capacity] | Mainly useful if absolute capacity or traffic load is also provided: E.g. this link has average load of 8 Mb/s which is 80% of the capacity. | | |
| Absolute link quality [ ] Relative link quality [ ] | Normalized link quality for different RATs Could be a relative value with respect to a RAT specific reference ideal link quality. | | |
| Absolute link capacity [kb/s - circuit-switched-equivalent] | Link capacity estimate | Reliability of estimate | Sensitivity is in general zero. |
| Hop count | =1 for each link (hop). | — | — |
| (Static) Link Capabilities E.g. Security Level [0 . . . 1] To what level is the link ciphered. To what level is the link integrity protected. | 0 = unsecure 1 = secure | — | — |

In the following it will be discussed how to determine route metrics from link metrics. The following notation will be used in the discussion:

$M_{i,j,k}$: link metric, where
- i denotes the route number,
- j denotes the hop number
- k denotes the type of metric $S_{i,j,k}$: metric sensitivity, i, j, and k as above $R_{i,j,k}$: metric reliability; i, j, and k as above It is assumed that a link management function LMF is located at each node, or at least in some of the nodes, in the multi-hop network. The LMF controls and/or monitors the link characteristics needed for determining a link metric. $LMF_i$ is the LMF located before hop number i. If there are n hops in a route, there are up to n+1 LMFs.

Different LMFs can exchange information for controlling/measuring link metrics, for example (multi-) radio resource management information. If an LMF is not available at each node, the LMF of another node can estimate the metrics for some hops. In case the metric estimation is imprecise, this may be reflected in a low reliability of the metric.

It is assumed that for each hop in a route a link metric $M_{i,j,k}$, a link metric sensitivity $S_{i,j,k}$ and a link metric reliability $R_{i,j,k}$ exist. These values are stored in the LMF unit of the node, or if the node has no LMF unit, in the LMF unit of another node. When a node is about to transmit data to a receiver its LMF unit calculates route metrics and route metric sensitivities and/or route metric reliabilities for different possible routes. The following steps are required to determine a route metric, a route metric sensitivity and a route metric reliability:

for each route all link metrics with respect to a parameter k and belonging to said route i are combined to a route metric $\tilde{M}_{j,k}=F(M_{i,j,k};S_{i,j,k}(p);R_{i,j,k})$ according to a function (F). Hereby the link metrics for all hops i along the route are considered and also the sensitivity with respect to a number of different parameters p may be considered similarly all link metric sensitivities $S_{i,j,k}(p)$ are combined to a route metric sensitivity $\tilde{S}_{j,k}(p)=F(S_{i,j,k}(p);R_{i,j,k})$ and all link metric reliabilities $R_{i,j,k}$ are combined to a route metric reliability $\tilde{R}_{j,k}=F(R_{i,j,k})$.

The routing decision is then made in the LMF unit of the relevant node, to select the best suited route. For this decision the $\tilde{M}_{j,k},\tilde{S}_{j,k}(p).\tilde{R}_{j,k}$ for different metric types can be combined and the sensitivity towards different input parameters p can be considered.

A pre-selection of valid routes can be determined as follows:

In a first step, all routes i that do not fulfil a minimum requirement for some metric type k are discarded (requirement $\tilde{M}_{j,k}>\tilde{M}_{k\ min}$) As an example, only routes where all links support a minimum security requirement are considered as valid routes.

In a second step, all routes i that do not have a minimum reliability for some metric type k are discarded (requirement $\tilde{R}_{j,k}>\tilde{R}_{k\ min}$). As an example, only routes where the metric about a supported rate is valid with a probability larger than 60% are allowed as valid routes.

From the remaining set of valid routes the one is selected which maximizes the decision metric, which can be expressed as:

$$\tilde{M}_j = \alpha(\tilde{M}_{j,k1}+\Delta p_1 \cdot \tilde{S}_{j,k1}(p_1)+\Delta p_2 \cdot \tilde{S}_{j,k1}(p_2)+\Lambda)+ \beta(\tilde{M}_{j,k2}+\Delta p_1 \cdot \tilde{S}_{j,k2}(p_1)+\Delta p_2 \cdot \tilde{S}_{j,k2}(p_2)+\Lambda)+\Lambda \quad (1)$$

Note that some metric $\tilde{M}_{j,k1}$ may be better when it has a large value (for example, supported rate, link quality, etc) while another metric $\tilde{M}_{j,k2}$ may be better when it has a small value (for example, delay, number of hops, etc). These differences need to be normalized when determining $\tilde{M}_j$. Also note that the above equation to determine $\tilde{M}_j$ is expressed in a linear form. Depending on the value range for a metric the equation for $\tilde{M}_j$ can also comprise other functional relationships of, for example, polynomial or exponential form.

There may also be a trade-off between several metrics. A utility function, known in the art, can be used to combine multiple metrics into one comparable value.

Link metrics, link metric sensitivity and link metric reliability must be distributed between the nodes in order for the various nodes to be able to determine a route metric M, a route metric sensitivity S and a route metric reliability R, respectively. As stated above, route metric sensitivity S, route metric reliability R or only one of the two may be used in addition to the route metric itself.

The distribution of link information across nodes creates signalling overhead and it is therefore desired to limit the amount of signalling. Therefore, link information should only be distributed when it is of significance to the route decisions.

Possible mechanisms for limiting the distribution of link information can be to distribute only when deemed necessary, and to aggregate for multiple links.

Triggers for distributing link information when it is deemed necessary can be based on, for example:
- if the sensitivity S has changed more than a certain amount
- if the reliability R has changed more than a certain amount or passed a specific threshold
- if the link metric M has changed more than a certain amount or passed a specific threshold (such as when a link bottleneck has been identified)

Aggregation of link information for multiple links can be used when forwarding metrics to nodes that are not able, or not allowed, to make routing decisions for these links. A possible mechanism for aggregation can be to calculate sub-route metrics in the same manner as is used for the complete route.

A distributed subscription approach can be used to notify other nodes of what information is to be forwarded and related triggers such as "only transfer this information when the metric has changed by more than 10%".

Each node will then subscribe to information from other nodes according to its own local needs and subscriptions from other nodes. The distributed subscription approach also provides input to each node on how to aggregate information. A node can also request required information from other nodes whenever that is desirable for making a routing decision either as an alternative or in addition to the subscription.

Figure 3:
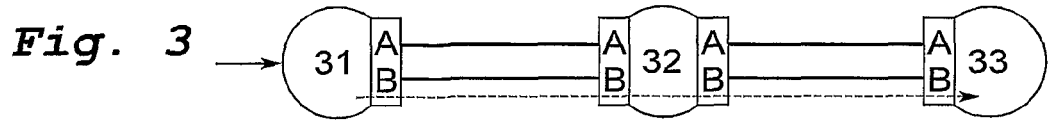
FIG. 3 illustrates a first example of how the method according to the invention can be applied.

FIG. 3 illustrates an example of how metric sensitivities with respect to load can be used to improve the routing decision when the route metric is the sum of the link metrics for all the links in the route.

A very small two-hop network is shown in FIG. 3. The network has three nodes 31, 32, 33. For each hop, there are two available Radio Access Technologies (RAT), A and B. The link metric for each link/hop i may, for example, be based on the equation $$M_i = \frac{1}{1-L/C} \quad (2)$$

where
- L is the current load of the link
- C is the capacity of the link
- ΔL is the incremental load of a new flow that should be routed from the first node 31 to the third node 33 through the second node 32.

The first hop, that is, between the first 31 and the second node 32 is designated 1 and the second hop, from the second 32 to the third node 33 is designated 2. The radio access technologies are designated A and B, respectively.

Table 2 shows the current values of L and C for the different links, and the resulting value of M for all links. As can be seen, for each hop, the value of M is lowest for RAT B. According to this prior art calculation, therefore, RAT B should be selected for both hops, resulting in a total route metric of 5.

TABLE 2 metric calculated before routing according to prior art

|   | 1A   | 1B | 2A  | 2B |
|---|------|----|-----|----|
| L | 7    | 10 | 6   | 3  |
| C | 10   | 15 | 10  | 5  |
| M | 3.33 | 3  | 2.5 | 2.5|

Assuming that $\Delta L1=1$, that is, the load of the new flow is 1, the situation after routing the new flow will be as shown in table 3. L will in each case be incremented by 1 resulting in a new value L', while C will remain unchanged. Thus a new metric value M' can be calculated according to $$M'_i = \frac{1}{1 - L'/C} \quad (3)$$

which is the same as $$M'_i = \frac{1}{1 - (L+\Delta L)/C} \quad (4)$$

the new value of M' for each hop is shown in Table 3.

TABLE 3 metric calculated after routing

|    | 1A | 1B   | 2A   | 2B |
|----|----|------|------|----|
| L' | 8  | 11   | 7    | 4  |
| C  | 10 | 15   | 10   | 5  |
| M' | 5  | 3.75 | 3.33 | 5  |

As can be seen, after the flow has been routed the route metric for the chosen route, using RAT B for each hop, is 8.33. If, however, RAT A is used instead for the second hop, then the route metric is reduced to 7.08, so a posteriori this would actually have been a better routing decision. The problem is that in most situations it would not be feasible to request updated metric values from the LMFs of all nodes first and then take the routing decision based on these updated metrics.

According to the invention metric sensitivities with respect to load can be used to improve the routing decision in this case. The derivative of Mi with respect to the load L can be used as the sensitivity Si:

$$S_i = \frac{\partial M_i}{\partial L} \quad (5)$$
$$= \frac{1}{C(1-L/C)}$$

The sensitivity depends on the load. According to the invention the LMF unit of each node computes the sensitivity in addition to the metric and exchanges both with other nodes as necessary.

When determining the route and the route metrics for the new flow the incremental load $\Delta L$ of this flow can already be considered by using the effective link metrics:

$$\tilde{M}_i = M_i + S_i \Delta L \quad (6)$$

Table 4 shows the values of L, C, M, S and M' in the same example as above. Accordingly, table 4 is identical to table 1, except that new rows holding values for S and M' has been added.

TABLE 4 metric calculated including sensitivity according to the invention

|   | 1A   | 1B  | 2A    | 2B   |
|---|------|-----|-------|------|
| L | 7    | 10  | 6     | 3    |
| C | 10   | 15  | 10    | 5    |
| M | 3.33 | 3   | 2.5   | 2.5  |
| S | 1.11 | 0.6 | 0.625 | 1.25 |
| $\tilde{M}$ | 4.44 | 3.6 | 3.125 | 3.75 |

As can be seen in table 4, the route having minimal route metric is in fact the route using RAT B for the first hop and RAT A for the second hop. It is worth noting that the sensitivities only provide accurate predictions of the updated metrics if the changes are small.

Figure 4:
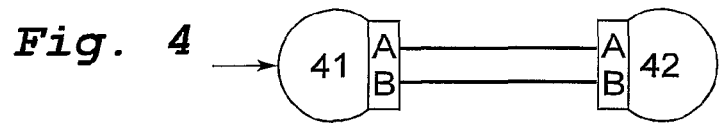
FIG. 4 illustrates a second example of how the method according to the invention can be applied.

With reference to FIG. 4 a second example of how to apply metric sensitivities according to the invention will be discussed. This example shows how metric sensitivities with respect to load are used when data can be transmitted between two nodes 41, 42 via a multitude of different channels (links). For simplicity, only two channels are shown; the example can be easily extended to an arbitrary number of channels. In this scenario the routing decision decides on which of the available channels is selected for transmission.

A one-hop connection with two different channels is considered. The metric for each channel is here based on the supported data rate r with respect to some reference data $r_{ref}$:

$$M = \frac{r_{ref}}{r} \quad (7)$$

The routing decision selects the link (channel) that minimizes the route metric.

In this example a new flow from node 1 to node 2 with incremental load $\Delta L=1$ is added. If the routing selection is only based on the link metric M according to equation (7) the flow would be routed via the channel A as shown in FIG. 4.

If the value of $r_{ref}=2$ Mb/s and r=5 Mb/s for RAT A and r=4 Mb/s for RAT B, then for RAT A M=0.4 and for RAT B M=0.5

However, the different channels can have quite different characteristics and in this case a routing decision based on the metric sensitivity may provide a better solution. For example, the different channels can a) differ in the type of RAT that is used with different resource characteristics and multiple access schemes
b) have a different number of users n accessing the channel
c) have different capacity C and different load L.

Although the metric is based on the supported data rate r this value can be determined according to a channel specific function that depends on, for example, C, n, L and some other values.

The sensitivity $$\frac{\partial r}{\partial L}$$

of r with respect to a change in traffic load L can be derived, for example, from empirical observations, or from the function that determines r. For a complex function a Taylor series approximation of this function can also be used to determine $$\frac{\partial r}{\partial L}.$$

In the given example, the metric sensitivity with respect to the traffic load S(1) can then be determined as $$S(L) = \frac{\partial M}{\partial L} \quad (8)$$
$$= \frac{\partial M}{\partial r} \frac{\partial r}{\partial L}$$
$$= -\frac{r_{ref}}{r^2} \cdot \frac{\partial r}{\partial L}$$

In this case, for FIG. 4 a metric sensitivity S(L) and a resulting decision metric $\tilde{M}$ for a traffic load increase of $\Delta L=1$ Mb/s is given. Although channel A has a lower link metric M and a higher supported rate r, the overall decision metric $\tilde{M}$ is lower for channel B. This is because r has different sensitivities for the different channels. One reason for this could be, for example, that channel A has a higher relative load of the channel capacity due to other traffic. Another reason could be that channel A uses a multiple access scheme that is more sensitive to load increase (for example, Carrier Sense Multiple Access) than channel B (which could use, for example, some reservation based multiple access scheme). Or channel A has a higher number of users accessing the channel.

Table 4 shows the values of r, M, S and the overall decision metric $\tilde{M}$ calculated according to the equation $$\tilde{M} = M + \Delta L \cdot S(L) \quad (9)$$
$$= M + \Delta L \cdot \frac{\partial M}{\partial L}$$

Where S(1) is as calculated according to equation (8).

TABLE 5 metrics for FIG. 4 according to the invention

|   | Channel A | Channel B |
|---|---|---|
| R | 5 Mb/s | 4 Mb/s |
| δr/δL | −3.5 | −1.2 |
| M | 0.4 | 0.5 |
| S | 0.28 | 0.15 |
| $\tilde{M}$ | 0.68 | 0.65 |

A third example is a two-hop wireless transmission where one hop is a fixed connection. This example is based on extending a multi-hop transmission paradigm into the functional distribution of transmission protocols within the RAN architecture. It is assumed, for example that the Multi-Hop ARQ concept (in some contexts referred to as "Multi-hop Generic Link Layer") is used. The link layer is terminated in a bearer gateway and the access points are already considered as relays. (In a WCDMA system the first hop would be the Iub interface between the RNC and Node B and the second hop would be the radio Uu interface.)

For this example it is assumed that one part of the multi-hop route does not have a metric since it is a priori assumed not to be the bottleneck (for example, because it is a fibre connection). As is shown by this example, the invention can be applied in an operating scenario where complete knowledge of the whole network is not available, that is, some hops must be considered as fixed connections.

Figure 5:
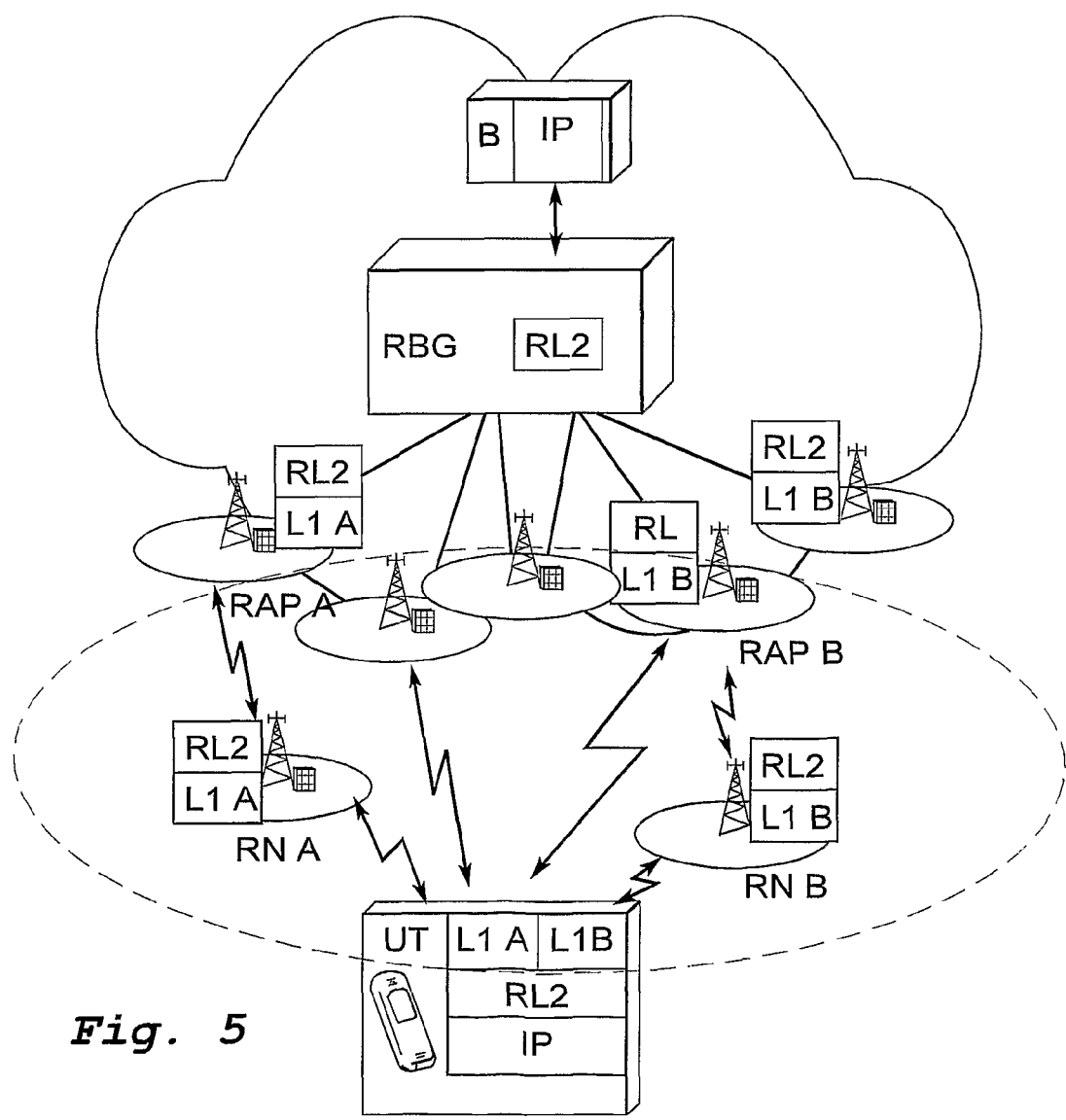
FIG. 5 illustrates a telecommunications multi-hop network comprising both a fixed and a wireless network.

In connection with the third example, FIG. 5 illustrates a telecommunications multi-hop network comprising both a fixed 51 and a wireless network 53. An L2 protocol RL2 spans from a radio bearer gateway RBG via a radio access point RAP to a user terminal UT. The connection from the RAP to the UT can also go via one or more intermediate relay nodes RN. In this case the link between RBG and RAP is a fixed link, which may not play a role at all in determining $\tilde{M}_{j,k}$ and $\tilde{S}_{j,k}$ since it has little influence on the overall performance of the route. For the route parameters, therefore, only the wireless links play a role and the fixed links are not considered.

The invention claimed is:

1. A communication node for use in a communication network in which data can be transmitted between a sender and a receiver via at least two different routes, each route comprising at least one link, said node comprising:
a link management function unit (LMF) arranged to:
calculate a metric value for each link;
calculate a reliability parameter value for each metric value;
discard any link from consideration when the reliability parameter value for the link is less than a defined minimum reliability parameter value;
calculate a sensitivity parameter value for each remaining metric value, said sensitivity parameter value being indicative of how the metric value for each link would change with a given change of a performance parameter of each link;
calculate a modified metric value for each link as the sum of the metric value for the link plus the product of the sensitivity parameter value and the change of the performance parameter for each link;
sum the modified metric values for all of the links in each route to obtain a modified metric sum for each route; and
select a lowest cost route through the communication network by selecting the route with the lowest modified metric sum.

2. The node according to claim 1, wherein the link management function unit (LMF) is arranged to calculate said sensitivity parameter value based on a derivative of said metric value with respect to a variable on which said metric value depends.

3. The node according to claim 1, wherein the link management function unit is arranged to transmit said metric values and/or said sensitivity parameter values and/or said reliability parameter values to at least one other link management function unit of another node in the communication network.

4. The node according to claim 1, wherein the link management function unit is arranged to receive metric values and/or sensitivity parameter values and/or reliability parameter values from at least one other link management function unit of another node in the communication network.

5. A method in a communication node in a communication network in which data can be transmitted between a sender and a receiver via at least two different routes, each route comprising at least one link, said method comprising the following steps performed by a link management function unit (LMF) in the communication node:
- calculating a metric value ($M_i$) for each link (i) in each route;
- calculating a sensitivity parameter value ($S_i$) for each metric value, said sensitivity parameter being indicative of how the metric value would change with a given change ($\Delta P$) of a network parameter (P);
- calculating a modified metric value $M_i\sim=M_i+S_i\Delta P$ for each link;
- summing the modified metric values for all of the links in each route to obtain a modified metric sum for each route; and
- selecting a lowest cost route through the communication network by selecting the route with the lowest modified metric sum.

6. The method according to claim 5, wherein the sensitivity parameter is based on a derivative of said metric with respect to a variable on which said metric depends.

7. The method according to claim 5, further comprising the step of calculating a reliability parameter for said at least one metric and taking said reliability parameter into account when selecting a route.

8. The method according to claim 5, further comprising the step of receiving metric and sensitivity parameter values related to at least a second link in the network and taking said received metric and sensitivity parameter values into account when selecting a route.

9. The method according to claim 5, further comprising the steps of:
- calculating a reliability parameter value for each metric value; and
- discarding any link from consideration when the reliability parameter value for the link is less than a defined minimum reliability parameter value.

10. A communication node for use in a communication network in which data can be transmitted between a sender and a receiver via at least two different routes, each route comprising at least one link, said node comprising:
- a link management function unit (LMF) arranged to:
  - calculate a metric value ($M_i$) for each link (i) in each route;
  - calculate a sensitivity parameter value ($S_i$) for each metric value, said sensitivity parameter being indicative of how the metric value would change with a given change ($\Delta P$) of a network parameter (P);
  - calculate a modified metric value $M_i\sim=M_i+S_i\Delta P$ for each link;
  - sum the modified metric values for all of the links in each route to obtain a modified metric sum for each route; and
  - select a lowest cost route through the communication network by selecting the route with the lowest modified metric sum.

11. The communication node according to claim 10, further comprising a signaling unit that sends the calculated metric values and sensitivity parameter values for each link to at least one other LMF in another communication node in the network.

12. The communication node according to claim 10, wherein the network parameter (P) is a current traffic load ($L_i$) on each link, and the LMF is adapted to calculate the metric value Mi as a function of $L_i$ and a capacity ($C_i$) of each link.

13. The communication node according to claim 10, wherein the LMF is also adapted to:
- calculate a reliability parameter value ($R_i$) for each metric value; and
- discard any link from consideration when $R_i$ for the link is less than a defined minimum $R_{imin}$.

14. The communication node according to claim 13, wherein the LMF is adapted to calculate the reliability parameter value ($R_1$) based on at least one of:
- reliability of the accuracy of an estimation of the metric value;
- rate of change of the metric value;
- frequency with which the metric value is estimated;
- frequency with which estimated metric values are distributed to the communication node; and
- signaling delay of the metric value.

* * * * *

UNITED STATES PATENT AND TRADEMARK OFFICE
CERTIFICATE OF CORRECTION

PATENT NO. : 8,023,424 B2  
APPLICATION NO. : 11/914657  
DATED : September 20, 2011  
INVENTOR(S) : Sachs et al.

Page 1 of 1

It is certified that error appears in the above-identified patent and that said Letters Patent is hereby corrected as shown below:

In Column 7, Line 50, delete " $M_{j,k} > M_{k\ min})$ " and insert -- $\tilde{M}_{j,k} > \tilde{M}_{k\ min})$ --, therefor.

In Column 14, Line 34, in Claim 14, delete "$(R_1)$" and insert -- $(R_i)$ --, therefor.

Signed and Sealed this
Tenth Day of January, 2012

David J. Kappos
*Director of the United States Patent and Trademark Office*